United States Patent
Ballard et al.

(10) Patent No.: US 7,237,184 B2
(45) Date of Patent: Jun. 26, 2007

(54) DATA PROPERTY PROMOTION SYSTEM AND METHOD

(75) Inventors: John D. Ballard, Woodinville, WA (US); Wei-Lun Lo, Issaquah, WA (US); Bimal K. Mehta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 10/739,714

(22) Filed: Dec. 18, 2003

(65) Prior Publication Data

US 2005/0138553 A1 Jun. 23, 2005

(51) Int. Cl.
*G06F 15/00* (2006.01)

(52) U.S. Cl. .................... 715/500; 715/501.1

(58) Field of Classification Search ............... 715/513, 715/501.1, 500
See application file for complete search history.

(56) References Cited

U.S. PATENT DOCUMENTS

| | | | | |
|---|---|---|---|---|
| 5,959,634 | A * | 9/1999 | Yoshida | 345/467 |
| 6,037,941 | A * | 3/2000 | Goto | 715/777 |
| 7,047,285 | B2 * | 5/2006 | Burgess | 709/220 |
| 2001/0039594 | A1 * | 11/2001 | Park et al. | 709/311 |
| 2002/0129059 | A1 * | 9/2002 | Eck | 707/513 |
| 2002/0147746 | A1 * | 10/2002 | Lee | 707/513 |
| 2002/0169842 | A1 * | 11/2002 | Christensen et al. | 709/206 |
| 2002/0193983 | A1 * | 12/2002 | Tokieda et al. | 704/2 |
| 2003/0018661 | A1 * | 1/2003 | Darugar | 707/500 |
| 2003/0046317 | A1 * | 3/2003 | Cseri et al. | 707/513 |
| 2003/0055748 | A1 * | 3/2003 | Bezrukov et al. | 705/27 |
| 2003/0066033 | A1 * | 4/2003 | Direen et al. | 715/513 |
| 2003/0074350 | A1 * | 4/2003 | Tsuda | 707/3 |
| 2003/0093664 | A1 * | 5/2003 | Miyoshi et al. | 713/150 |
| 2003/0149588 | A1 * | 8/2003 | Joao | 705/1 |
| 2003/0236903 | A1 * | 12/2003 | Piotrowski | 709/231 |
| 2004/0027379 | A1 * | 2/2004 | Hong Huey et al. | 345/764 |
| 2004/0028049 | A1 * | 2/2004 | Wan | 370/394 |
| 2004/0030993 | A1 * | 2/2004 | Hong Huey et al. | 715/513 |
| 2004/0103141 | A1 * | 5/2004 | Miller et al. | 709/203 |
| 2004/0181671 | A1 * | 9/2004 | Brundage et al. | 713/176 |
| 2004/0205552 | A1 * | 10/2004 | Vosburgh | 715/513 |
| 2004/0243464 | A1 * | 12/2004 | Beck | 704/14 |
| 2005/0050391 | A1 * | 3/2005 | Grieskamp et al. | 714/25 |
| 2005/0097084 | A1 * | 5/2005 | Balmin et al. | 707/3 |
| 2005/0166139 | A1 * | 7/2005 | Pittman et al. | 715/511 |
| 2006/0031757 | A9 * | 2/2006 | Vincent | 715/513 |

OTHER PUBLICATIONS

Glushko et al., An XML Framework for Agent-based E-commerce, ACM Mar. 1999, pp. 106-114.*

(Continued)

*Primary Examiner*—Cong-Lac Huynh
(74) *Attorney, Agent, or Firm*—Woodcock Washburn LLP

(57) ABSTRACT

A method for promoting properties for processing a message in a business automation system includes the steps of receiving a message which has a plurality of parts where each part has associated properties; identifying the associated properties to be promoted; extracting the information of the promoted property; storing the information of the promoted property in a memory; and processing the message by accessing the information of the promoted property from the memory instead of directly from the message. The method may further include correlating a received message with an earlier processed message by using a correlation method utilizing a strong naming convention to generate a correlation identifier.

28 Claims, 4 Drawing Sheets

OTHER PUBLICATIONS

Hayes et al., Workflow Interoperability Standards for the Internet, IEEE 2000, pp. 37-45.*

Abrahams, A. et al., "Asynchronous Rule-Based Approach for Business Process Automation Using Obligations", *Third ACM SIGPLAN Workshop on Rule-Based Programming*, 2002, 93-103.

Aversano, L. et al., "Introducing eServices in Business Process Models", *Proceedings of the 14th International Conference on Software Engineering and Knowledge Engineering*, 2002, 481-488.

De Jong, S.P. et al., "Application Design Within the System for Business Automation(SBA)", *Proceedings of the 12th Design Automation Conference*, 1975, 69-76.

Medjahed, B. et al., "Business-to-Business Interactions: Issues and Enabling Technologies", *The VLDB Journal-The International Journal on Very Large Data Bases*, 2003, 12(1), 59-85.

Swenson, K.D. et al., "Workflow Technology: Tradeoffs for business Process Re-engineering", *Proceedings of Conference on Organizational Computing Systems*, 1995, 22-29.

Microsoft Message Queuing (MSMQ) Center,http://www.microsoft.com/windows2000/technologies/communications/msmq/default.asp, 5 pages.

* cited by examiner

DATA PROPERTY PROMOTION SYSTEM AND METHOD

FIELD OF THE INVENTION

The invention relates generally to the field of business process automation and more specifically to the efficient processing of documents in an automated business process.

BACKGROUND OF THE INVENTION

Business procedures have typically been automated using a business procedures processor running a model of the business process. This model is the workflow process. Recently, the extensible markup language (XML), which is a world wide web consortium (W3C) standard, has gained popularity for expressing business documents in a standardized format. Innovations such as Biz Talk™ from Microsoft® Corporation (One Microsoft Way, Redmond, Wash. 98052) have introduced the idea that a business workflow processor can orchestrate business transactions using the XML standard to accomplish document transfers in the course of daily business.

The processing of XML documents often requires opening up the document at various points in the processing and routing among organizations within an enterprise. Often, the same information is checked when a document is opened. For example, if a purchase order is being routed in an enterprise between different departments, the total amount of the purchase order may be checked repeatedly or may be updated based on authorization limits. Additionally, the total dollar amount may vary as various departments add or subtract line items and quantities on the purchase order. In this instance, the purchase order must be opened, searched for the total dollar amount information, information retrieved, and then closed by nearly every department in the enterprise. The repeated access of the same data from the document can be performed more efficiently if a mechanism for accessing the data without opening the document were available.

A second inefficiency in the processing of documents in a business procedure automation environment is the correlation of messages. Documents may be viewed as messages that are passed from one department to another. Eventually, the messages may be transferred out of the enterprise environment. For example, a purchase order for supplies may be generated within a business environment and be sent to some external vendor fill the purchase order. Eventually, a confirmation message may be returned. However, there is currently no standardized method to automatically correlate the confirmation message with any previously processed or internally routed message. A content examination may be required to manually determine the correspondence of one message to another. This inefficiency could be avoided if there was a mechanism to correlate messages in an automated business processing environment.

Thus, there is a need for a method and system which would allow selected message information which is accessed repeatedly to be available to a message processor. Additionally, it would be useful if the message processor could correlate new messages with existing ones in an enterprise environment. The present invention addresses the aforementioned needs and solves them with additional advantages as expressed herein.

SUMMARY OF THE INVENTION

The invention includes a method for processing a message in a business automation system. The steps include receiving a message having a plurality of parts, each part having associated properties, identifying at least one of the associated properties to be promoted, extracting the information of the promoted property, storing the information of the promoted property in a memory, and processing the message by accessing the information of the promoted property from the memory instead of directly from the message. The message may contain a message body, an attachment, a system property, and an application property. The promoted property of the message may be either metadata or message content. In one embodiment, the promotion method of identifying the promoted property and the extracting of the promoted property information may utilize XPath standard XPath is the XML Path language and is a component of the Extensible Stylesheet Language (XSL) that is used to identify tagged XML elements. XPath may be used to calculate numbers and manipulate strings occurring in XML. XSL and XML are standards from the World Wide Web Consortium (W3C).

The promoted property may be demoted upon exit of the message from the automated business processing system. A subsequently received message may be correlated to an earlier processed message by comparing naming conventions or a correlation identifier which may be a part of the promotion process.

A system for the promotion of properties utilizes the method of the invention along with a message receiver, a processor and memory, and a message transmitter. Once again, a correlation identifier may be used to correlate subsequently received messages with those already processed by the system.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The content or metadata property in a message is promoted such that the promoted property need not be accessed during message processing. This is accomplished by elevating the promoted property out of the message and storing the property in a memory. As a consequence of property promotion and strong name usage, a message may be correlated with other messages having the same strong name assignment. Therefore, if a message is sent out of a message processing environment and a modified or new message is later received, the strong naming convention may be used to correlate the sent message with the newly received message.

After discussing an exemplary computing environment in conjunction with FIG. 1 in which the invention may be practiced, exemplary embodiments will be discussed in conjunction with FIGS. 2 through 4.

Exemplary Computing Device

Figure 1:
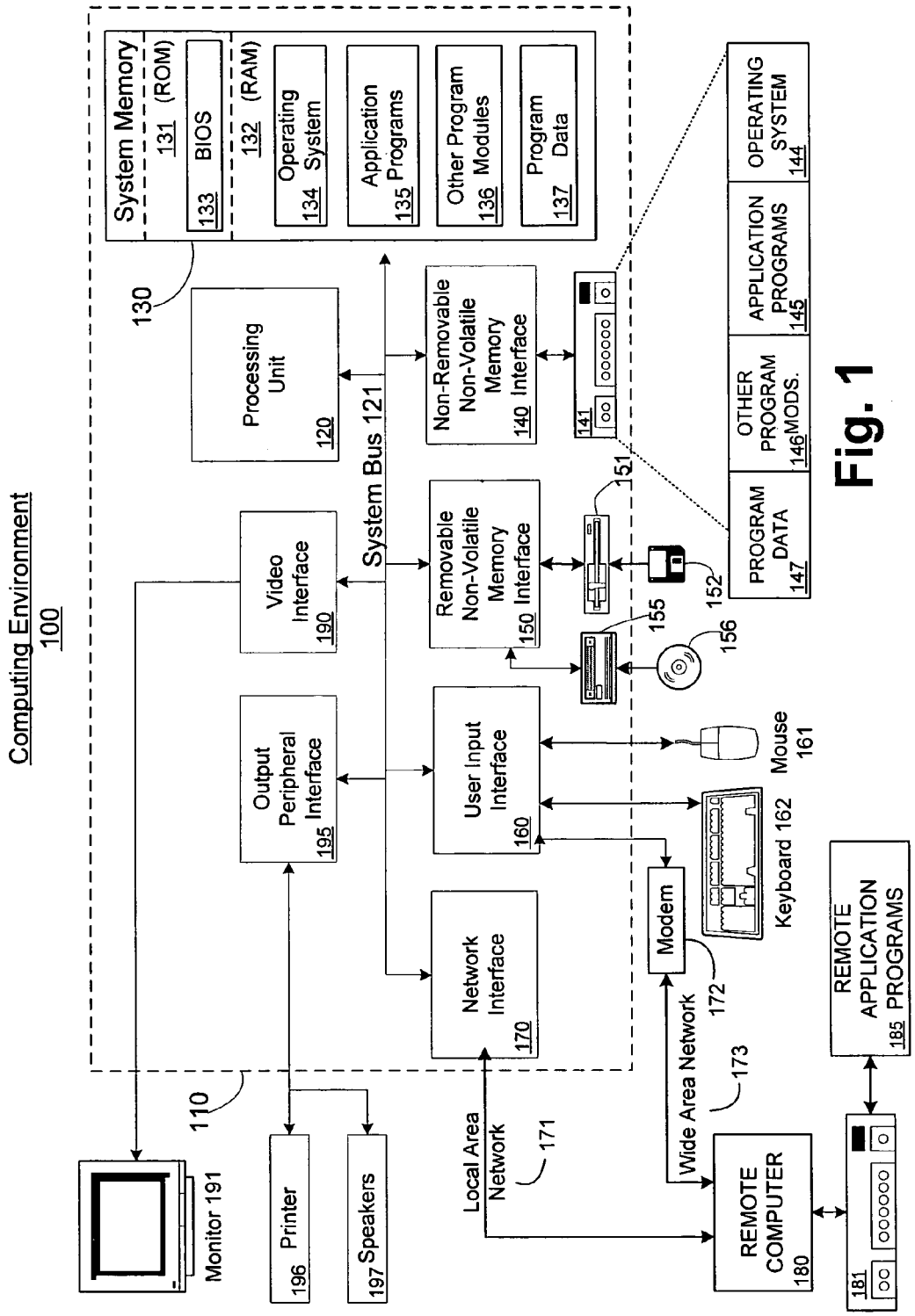
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the invention. Thus, while a general purpose computer is described below, this is but one example, and the invention may be implemented with other computing devices, such as a client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform includes servers, building-block services, such as Web-based data storage, and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET™'s languages and services, and in other distributed computing frameworks as well.

Exemplary Embodiments of the Invention

Figure 2:
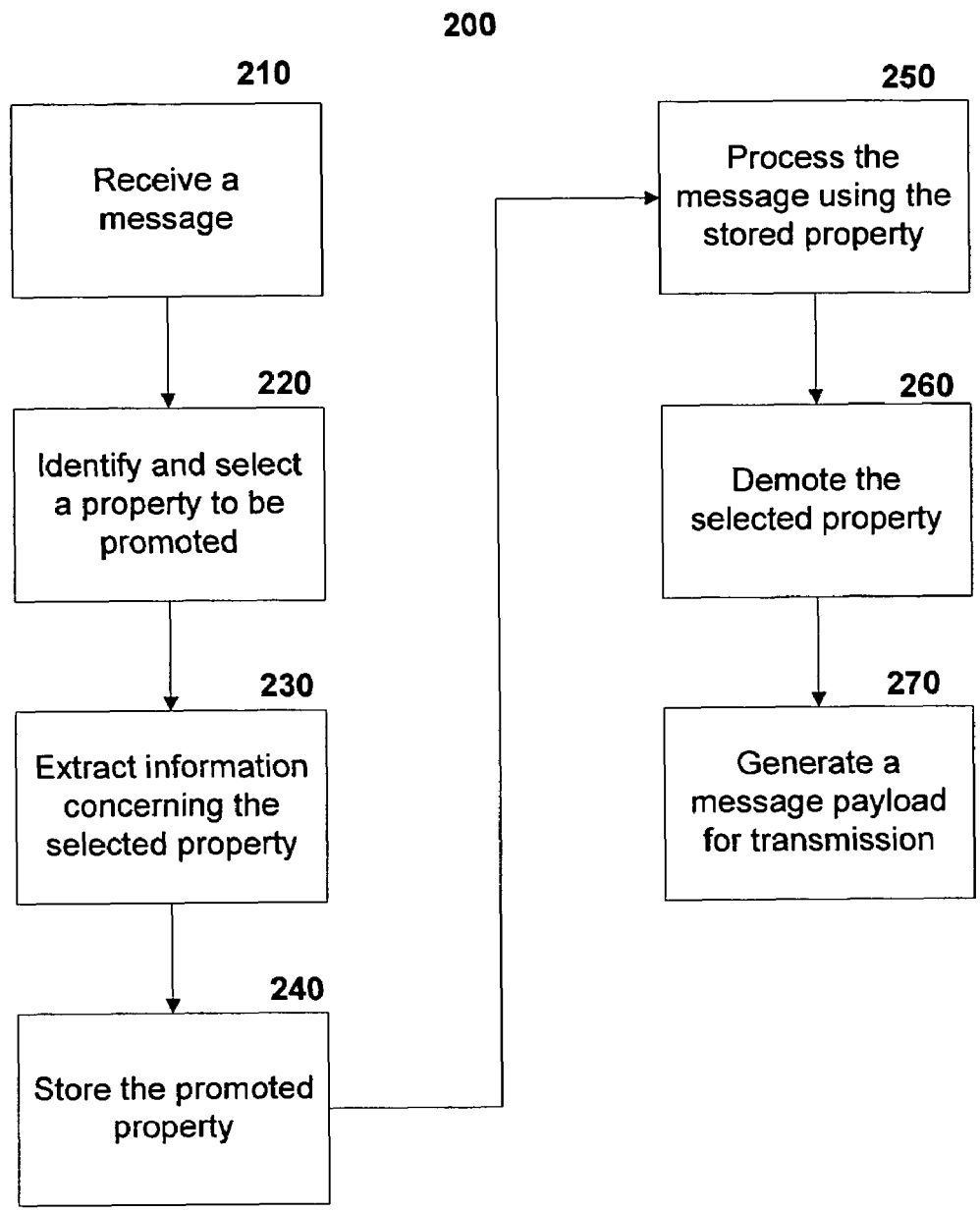
FIG. 2 illustrates a flow diagram of an exemplary method of message processing using a property promotion aspect of the invention.

FIG. 2 depicts a block diagram of an exemplary embodiment of a method 200 that accommodates message processing using a property promotion aspect of the invention. The process may be initiated by the receipt of a message 210. A message may include a web services description language (WSDL) representation of a message wherein XML is the preferred language and wherein the message may include multiple parts. For example, the message may include the message body, the message attachments, termed content, as well as metadata including system properties and application properties. One of the properties to be promoted may then be identified by a user and be subsequently selected 220. In one embodiment of the current invention, this selection may be performed using a graphical interface using the XPath standard. After selection, information concerning the selected property is extracted from the message 230 and placed into a memory 240. This is accomplished to allow subsequent access to the promoted property information without actually retrieving the information from the message itself. This property promotion saves time in message processing by eliminating repetitive retrievals of the message to examine the property information.

The message may be processed 250 using the easily accessible promoted property information from the persistent storage. In one embodiment, the message may be used as part of a business workflow processor wherein a message or document, such as a purchase order for goods or services, requires the access to the promoted property at operation nodes in the workflow. For example, the total price of a purchase order may be a promoted property and may have to be exposed at multiple discrete points along the workflow path. As the message is processed and the promoted property is needed for repetitive access by different workflow operational nodes, the promoted property may be examined by retrieving a quickly responding random access buffer instead of opening an attachment or the body of the purchase order, searching and finding, and then retrieving the total price property value. According to the present invention, the promoted property is more accessible for the business workflow purpose as a stored value than it is as an embedded value in part of the message as either the body, an attachment, or a system or application property of the message. However, message content may be merged with the promoted property while transmitting a message.

After the message is processed, then the selected property may be demoted 260. Active demotion may be an optional action. Demotion may include dropping the stored value. The promoted value, useful in message processing, may not be needed for transport to a final destination. Therefore, demotion of the promoted value 260 may be accomplished before final construction of the processed message into a message payload for transmission to a destination 270. Alternately, demotion may occur as a default occurrence because the promotion cannot be transported with the transmission of the message.

In one embodiment of the present invention, a system and application properties may be represented as XML documents called property documents. The choice of XML as the standard for business document representation comports with such products as Microsoft® Biz Talk™ which can implement a business workflow process. The environment of a business workflow process may be used to orchestrate the movement of a business document through a process which may include not only internal nodes to an organization, but also external nodes such as suppliers and customers. As such, the XML documents may all be collectively termed messages which may contain various parts including a body, an attachment, and property documents. All of these parts may conform to the web services description language standard.

XML Schemas may be used for property definition documents. Annotations within the XML Schemas may define the properties associated with a particular schema and also indicate that these properties may be promoted at runtime. A property can be a primitive data type (such as an integer data type, a decimal data type or a string data type) as defined by XML standards.

In one embodiment, XPath queries may be used to select and establish the promoted properties. The basic data integrity check afforded schema property values are also afforded in the present invention, For example, property values are subject to schema data type validation. Additionally, namespace registration and resolution in the application of the invention may register and resolve property prefixes. A centralized schema cache may contain the document specification, envelope specifications, extensible stylesheet language templates, and property schemas.

The message in a web services description language may contain multiple parts. The present invention may assimilate the system and application properties, along with content properties, into an overall, conceptual representation. One exemplary representation is as follows:

```
<message xmlns="SOAP namespace"
    xmlns:sys="SystemProps namespace"
    xmlns:po="PO namespace"
    name="PO" >
    <body>
        <Envelope ...>
            <po:PurchaseOrder>
            ...
            </po:PurchaseOrder>
            ...
        </Envelope>
    </body>
    <context>
        <sysprops>
            <sys:source>MSFT</sys:source>
            <sys:destination>DELL</sys:destination>
        </sysprops>
    </context>
</message>
```

The above example message contains two parts. The body part contains the purchase order wrapped in Biz Talk™ framework header. The context part contains system properties which in turn contains example source and destination nodes.

Property schemas may contain property definitions for system or application properties. The following schema defines two system properties: "source" and "destination".

```
<schema xmlns="http://www.w3.org/2000/10/XMLSchema"
    targetNamespace="SystemProps namespace"
    xmlns:sys="SystemProps namespace"
    xmlns:bts="BizTalk namespace">
    <complexType name="Properties">
        <all>
            <element name="source" type="string"
                minOccurs="0" maxOccurs="1"/>
            <element name="destination" type="string"
                minOccurs="0" maxOccurs="1"/>
        </all>
    </complexType>
    <element name="sysprops" type="Properties">
        <annotation>
            <appInfo>
                <bts:property name="source" xpath="./source"/>
                <bts:property name="destination" xpath="./destination"/>
            </appInfo>
        </annotation>
    </element>
</schema>
```

According to an aspect of the invention, the XPath queries points to where the actual values for the properties may be stored. Subsequent message processing may utilize these stored values instead of accessing message parts themselves to search and find data for the promoted properties.

As an additional example, the following document schema defines a local custom property entitled "payment" and contains two references to the system properties:

```
<schema xmlns="http://www.w3.org/2000/10/XMLSchema"
    targetNamespace="PO namespace"
    xmlns:bts="BizTalk namespace"
    xmlns:sys="SysProps namespace">
    <import namespace="SysProps namespace"/>
    <element name="PO">
        <annotation>
            <appInfo>
```

```
    <bts:property name="sys:source" xpath="./PO/src"/>
    <bts:property name="sys:destination" xpath="./PO/dest"/>
    <bts:property name="payment" xpath="./PO/payment"/>
  </appInfo>
 </annotation>
 <complexType>
  ...
 </complexType>
</element>
</schema>
```

In another aspect of the invention, the property extraction mechanism above assumes the business orchestration software engine, such as Biz Talk™, may organize and pipeline the details of the property extraction. However this process may be formally defined using an XML stylesheet language transformation. For example, using the transformation, one may map the element "./PO/Src" in POInst.xml to ./sysprops/source. In this manner, a schema writer may promote message properties without resorting to writing custom pipeline components.

In one embodiment, namespace registrations may be performed at design or deployment time while resolutions may be accomplished at runtime. The namespace registrar may provide the interface for registering and resolving namespaces. One method of registration of a prefix and namespace is to call a declarePrefix statement, an example of which follows:

pNM->declarePrefix(L"BTS", L"urn:schemas-microsoft-com:BizTalkServer");

Likewise, to resolve a prefix, a getURI method may be used, as shown in this example:

```
BSTR bstrNamespaceURI=NULL;
pNM->getURI(L"BTS", &bstrNamespaceURI);
```

Note that the prefix definitions are strictly for the properties only and that registration does not interfere with regular XML message processing. In one embodiment of the invention, promoted properties are stored in a memory, such as random access memory, in the form of a database table. This table may be referred to as a promotion table and an example may be generated as follows:

```
CREATE TABLE [dbo].[Promotion] (
    [PropertyID] [bigint] IDENTITY (1, 1) NOT NULL,
    [NameSpace] [text],
    [XPath] [text],
    [Type] [nchar] (32),
) ON [PRIMARY] TEXTIMAGE_ON [PRIMARY]
GO
```

The PropertyID is a desirably unique ID for the promoted property. The unique ID may be a globally unique identifier (GUID). The NameSpace and XPath fields may work together to uniquely identify a node in the document instance. The NameSpace field contains the XML namespace of the document. The XPath query that may be used to select the data item (i.e., an element or attribute) may be contained in the XPath field.

In one embodiment, a property defining schema may be stored in the schema cache and the properties and their XPath queries are stored in the promotions table. An example of multiple schemas utilizing even more IDs is presented in Table 1 as follows:

TABLE 1

Multiple schema, multiple ID example

| GUID | SchemaName | Namespace | Name | XPath |
|------|------------|-----------|------|-------|
| 1 | SysProps.xml | sys | Source | ./source |
| 2 | SysProps.xml | sys | destination | ./destinarion |
| 3 | POSchema.xml | po | payment | ./PO/Payment |
| 4 | POSchema.xml | sys | Source | ./PO/Src |
| 5 | POSchema.xml | sys | destination | ./PO/Dest |

Figure 3:
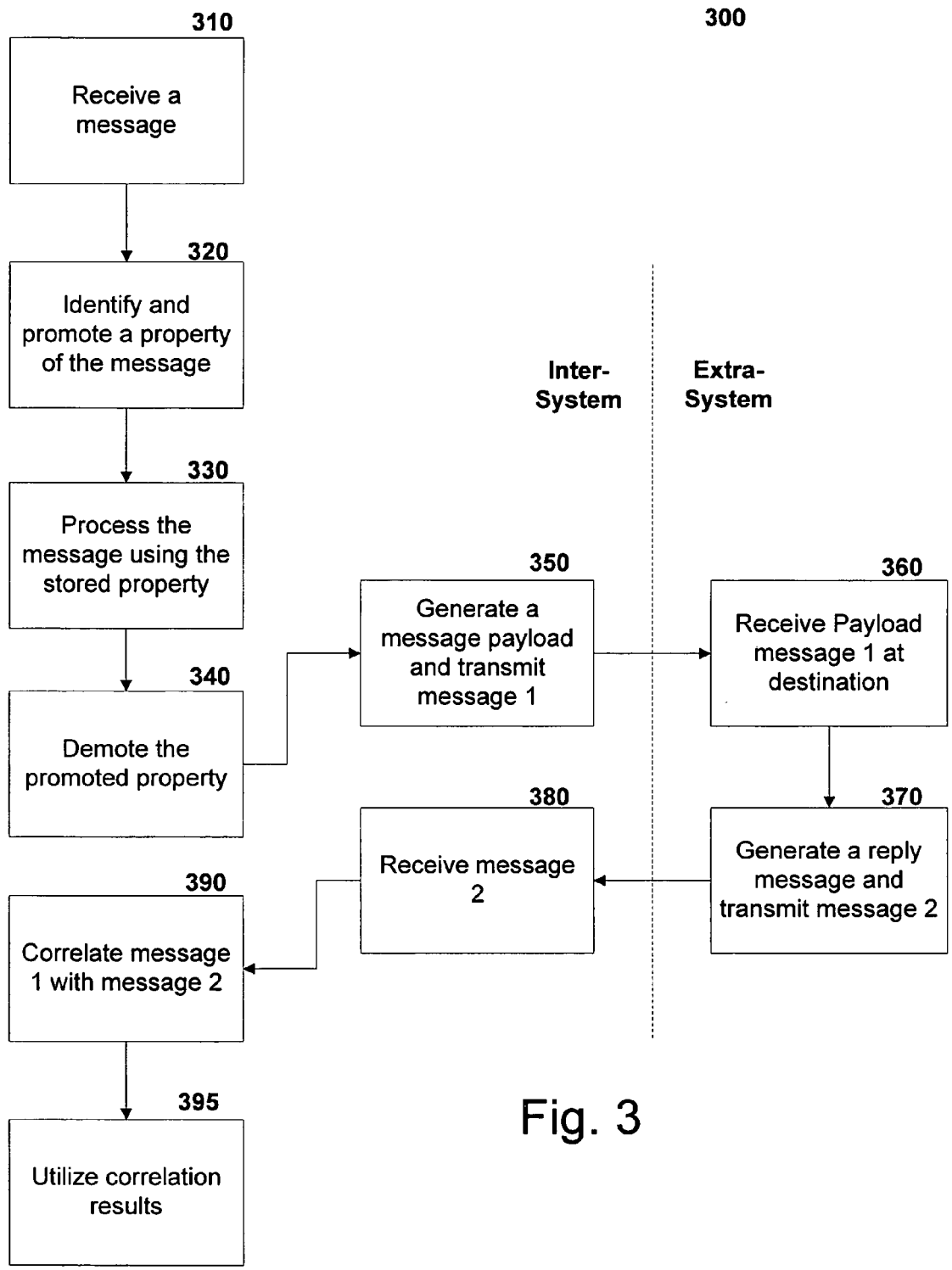
FIG. 3 illustrates a flow diagram of an exemplary method of message processing using a correlation aspect of the invention.

FIG. 3 depicts a block diagram of an exemplary embodiment of a method 300 that accommodates message processing using a correlation aspect of the invention. The correlation of messages sent and received via a strong naming system is desirably accommodated. In one embodiment of the invention, a correlation ID may be generated. The correlation ID may be a property whose unique name is formed by combining an assigned namespace with a name. For instance, a property with namespace:
"http://schemas.microsoft.com/BizTalk/2003/system-properties"
and name "MessageType" may be referred to as:
"http://schemas.microsoft.com/BizTalk/2003/system-properties#MessageType".

This reference can become a correlation ID that may become a property that the system 300 can use to relate one message to another.

A message may be received 310 by a system utilizing the invention. As an aspect of the invention, a user may identify and promote a property of the message 320 to better accommodate the efficient processing of the message. A user may perform this via a user interface or via a program interface using XML schemas to define the promoted property. As indicated herein previously, the message may be processed preferably using a stored value of the promoted property 330. The processing of the message may be made more efficient by utilizing the stored promoted value instead of opening, searching, reading, and then closing the message body, attachment, or system and application property values.

After the message has been processed, the promoted property may be demoted 340 or rendered inactive with respect to the extra-system processing. Although a property may be demoted, at least the strong name provided to the promoted property remains and thus correlation may be performed. After demotion, the processed message may be formulated into an message payload 350 suitable for external transmission. In FIG. 3, this message payload is termed message 1. The transmitted message payload may travel out of the internal message processing system 300 and be received at an external destination 360.

Processing of the message at the external destination may occur and a reply may be generated 370. The reply most likely will take the form of a new or modified message. For the example of FIG. 3, this new message is termed message 2. The newly generated message 2 may then be transmitted back to the system 300 and may be received as a new incoming message 380. The incoming message 2 may be examined for previously applied promotion properties by inspecting metadata related to the message. Based on a strong name or a correlation ID associated with at least one of the promoted properties, a correlation may be drawn 390 with respect to a message sent and a message received. Thus, if a strong name or correlation ID is used to identify a promoted property in an outgoing message, such as message 1, and the same strong name or correlation ID is discovered as part of an apparently independent incoming message, such as message 2, the two messages may be correlated and may therefore be linked or related. This correlation allows the message processing system 300 to relate seemingly independent messages so as to provide system users the opportunity to see and address 395 stimulus and response type messages exposed via the correlation function of the invention.

Figure 4:
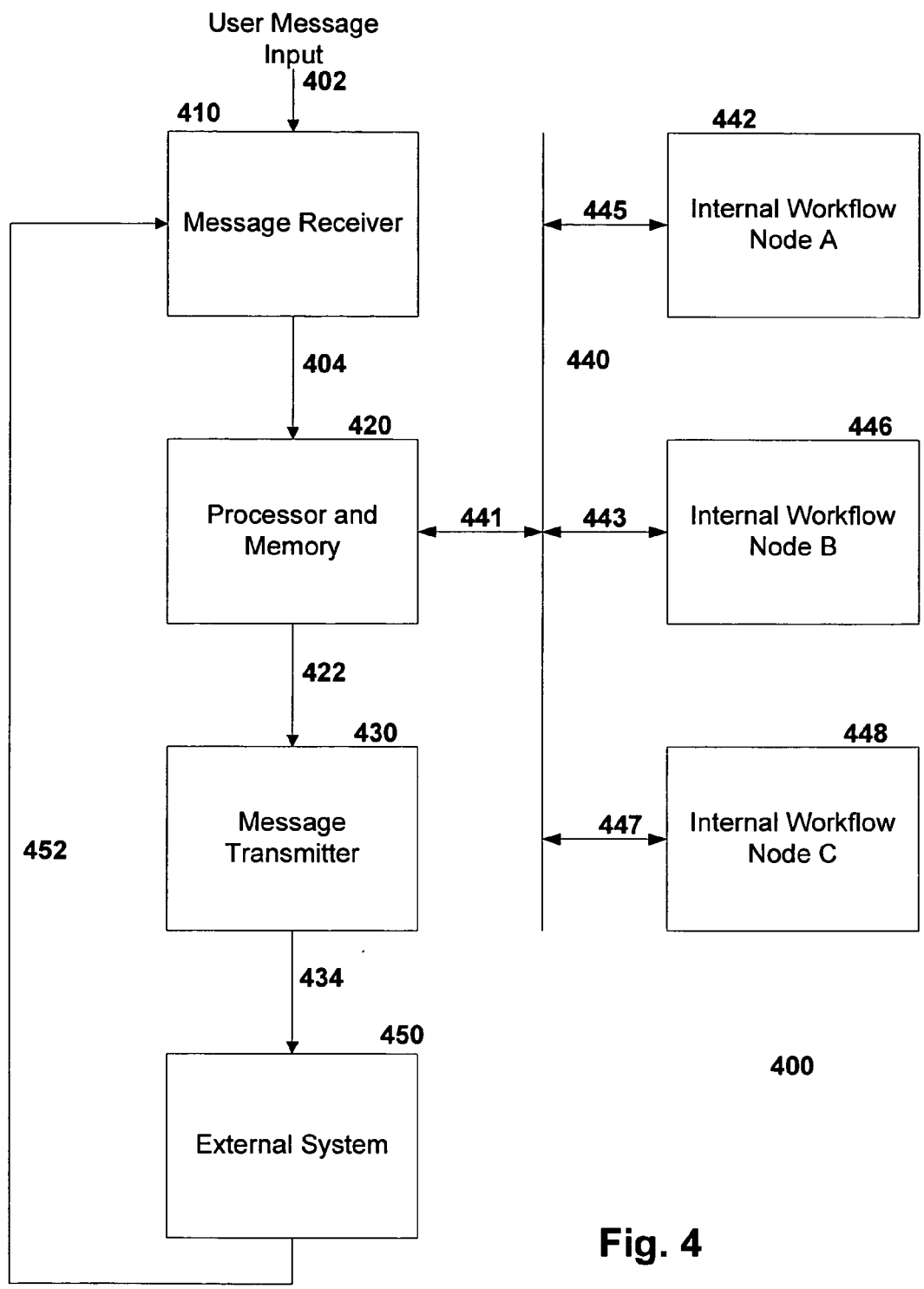
FIG. 4 illustrates an exemplary block diagram of a system embodying aspects of the invention.

FIG. 4 shows a block diagram of a system 400 incorporating aspects of the present invention. A message receiver 410 may receive a message input 402. Such an input may be generated, for example, by a system user to request the system to route the message throughout a business enterprise. In one embodiment, at the time the message is received, a user may have selected specific properties of the message to be promoted according to the invention. At that time a naming convention for the message may be made to identify the message as it passes throughout the system. The received message and selected properties may be provided 404 to a processor and memory 420. Here, the processor may promote the selected properties by storing those selected properties in a memory, such as a random access memory. The memory may also be used to store program memory. Such program memory may include XML schemas with annotations defining the properties to be promoted. XML stylesheet information as well as other related applications may also be a part of memory.

The processor 420 may provide the message with the promoted properties to one or more internal workflow nodes 442, 446, 448 via inter-node connections 441, 443, 445, 447. These interconnections may be an internal system bus, local area network interfaces, or other intersystem connection as is well known by those of skill in the art. The message may be modified in some manner at any of the internal workflow nodes 442, 446, 448 and subsequently returned to the processor 420 for continued processing. Preferably, when a workflow node requires data of the promoted property, it may access that property information by accessing the persistent storage instead of opening the message.

After internal processing, the message may then be transmitted from the processor 420 through a link 422 to a message transmitter 430 for subsequent linking 434 to an external system 450. The promoted data may be demoted by default at that time. The external system may modify the message and eventually return either the message or a response to the message via a link 452 back into the message received 410. The message is received by the message receiver 410 and may be processed when passed to the processor 420. Here, the new message may be correlated to the original message via the strong naming convention used when the original message has its properties promoted. Thus the newly received message may be paired with the original message and reviewed by a user operating at one of the many internal workflow nodes in the system.

As mentioned above, while exemplary embodiments of the invention have been described in connection with various computing devices and network architectures, the underlying concepts may be applied to any computing device or system in which it is desirable to implement an automated business message processing system. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the discussed invention. Additionally, any storage techniques used in connection with the invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the invention should not be limited to any single embodiment, but rather should be construed in breadth and scope in accordance with the appended claims.

What is claimed is:

1. A method for processing a message within a workflow environment, comprising the steps of:
   receiving an XML message having a plurality of parts, each part having associated properties;
   identifying at least one of the associated properties to be promoted;

extracting information of the promoted property, wherein the information comprises a value of the XML message;

storing the extracted information of the promoted property in a memory;

sending the XML message and the information of the promoted property together to a workflow node;

receiving the XML message and the information of the promoted property at the workflow node; and at the workflow node, performing workflow processing of the XML message by accessing the received information of the promoted property from a random access buffer instead of extracting the value of the promoted property from the XML message.

2. The method of claim 1, further comprising:

merging message content with the promoted property while transmitting a message.

3. The method of claim 1, wherein receiving a message having a plurality of parts comprises receiving a message comprising one or more of a body, an attachment, a system property and an application property.

4. The method of claim 1, wherein identifying at least one of the associated properties to be promoted comprises identifying at least one of message metadata, attachment metadata, message content and attachment content.

5. The method of claim 1, wherein storing the information of the promoted property in a memory comprises storing property information in a promotion table.

6. The method of claim 1, further comprising accessing the information of the promoted property from the memory during a subsequent runtime.

7. The method of claim 1, wherein the steps of identifying and extracting use an XPath standard.

8. The method of claim 1, further comprising demoting the promoted property after processing the message.

9. The method of claim 1, further comprising combining processing results into a message payload for transport to a destination.

10. The method of claim 1, further comprising providing the ability to correlate a first message with a second message.

11. The method of claim 10, wherein providing the ability to correlate comprises generating a correlation identifier for a first message, detecting a correlation identifier associated with a second message and establishing that a correlation exists if the correlation identifiers in the first and second messages match.

12. A computer-readable storage medium having stored thereon computer-executable instructions for performing steps for processing an XML message at a workflow node, the computer-readable medium instructions, when executed, performing steps comprising:

receiving an XML message having a plurality of parts, each part having associated properties;

identifying at least one of the associated properties to be promoted;

extracting the information of the promoted property, wherein the information comprises a value of the XML message;

storing the information of the promoted property in a memory;

sending the XML message and the information of the promoted property together to a workflow node;

receiving the XML message and the information of the promoted property at the workflow node; and at the workflow node, performing workflow processing of the XML message by accessing the received information of the promoted property from a random access buffer instead of extracting the value of the promoted property from the XML message.

13. The computer-readable medium of claim 12, wherein receiving a message having a plurality of parts comprises receiving a message comprising one or more of a body, an attachment, a system property and an application property.

14. The computer-readable medium of claim 12, wherein identifying at least one of the associated properties to be promoted comprises identifying at least one of message metadata and message content.

15. The computer-readable medium of claim 12, wherein storing the information of the promoted property in a memory comprises storing property information in a promotion table.

16. The computer-readable medium of claim 12, having further computer-executable instructions for combining processing results into a message payload for transport to a destination and demoting the promoted property.

17. The computer-readable medium of claim 12, having further computer-executable instructions for providing the ability to correlate the message with another message, the correlation comprising the use of a correlation identifier.

18. A system for the promotion of properties in message processing of a workflow environment, the system comprising:

an input device for receiving an XML message;

a processor and a memory, configured to process the message using promotion of properties with a method comprising:

receiving the XML message using the input device, wherein the message includes a plurality of parts, each part having associated properties;

identifying at least one of the associated properties to be promoted;

extracting information related to the at least one promoted property, wherein the information comprises a value of the XML message;

storing the information in the memory;

sending the message and the information of the promoted property together to a workflow node;

receiving the XML message and the information of the promoted property at the workflow node; and at the workflow node, performing workflow processing of the XML message by accessing the received information of the promoted property from persistent storage instead of extracting the value of the promoted property from the XML message; and an output device for passing a message payload comprising the processed message to a destination.

19. The system of claim 18, wherein the plurality of parts comprise one or more of a body, an attachment, a system property and an application property.

20. The system of claim 18, wherein the promoted property consists of at least one of message metadata, attachment metadata, message content and attachment content.

21. The system of claim 18, wherein the memory comprises a promotion table.

22. The system of claim 18, wherein the processor demotes the promoted property after message processing.

23. The system of claim 18, wherein the processor checks for a correlation between messages using an identifier associated with a property name.

24. The system of claim 18, wherein the processor checks for a correlation between messages using a globally unique identifier (GUID).

25. A computer-readable medium, having stored thereon an application capable of promoting a property of an XML message part in a workflow environment, the application comprising:
- a data structure capable of accepting a web services description language message having a plurality of parts, each part having a selectable property;
- at least one selected property, which upon selection becomes a promoted property, the promoted property comprising a value;
- an XML schema defining the promoted property;
- a table wherein the property is uniquely identified; and
- instructions for storage of the promoted property into a memory and transmittal of the message and the promoted property together to a receiving workilow node, wherein subsequent access of the promoted property comprises reading a random access buffer at the receiving workflow node instead of by extracting the value of the promoted property from the message during workflow processing of the message by the receiving workflow node.

26. The computer-readable medium of claim 25, wherein the application further comprises a correlation function to relate a first message to a second message.

27. The computer-readable medium of claim 26, wherein the correlation function comprises using a correlation identifier in the first message and comparing a correlation identifier in a second message to reveal a relationship between the messages.

28. The computer-readable medium of claim 26, wherein the correlation function comprises the use of a globally unique identifier (GUID).

* * * * *